United States Patent [19]

Shimoda et al.

[11] Patent Number: 5,100,741
[45] Date of Patent: Mar. 31, 1992

[54] MAGNETO-OPTIC RECORDING SYSTEMS

[75] Inventors: Tatsuya Shimoda; Satoshi Shimokawato; Shin Funada; Mamoru Sugimoto; Akira Aoyama; Satoshi Nebashi, all of Nagano, Japan

[73] Assignee: Seiko Epson Corporation, Tokyo, Japan

[21] Appl. No.: 193,020

[22] Filed: May 12, 1988

Related U.S. Application Data

[63] Continuation-in-part of Ser. No. 775,069, Sep. 11, 1985, abandoned.

[30] Foreign Application Priority Data

| Sep. 12, 1984 | [JP] | Japan | 59-191201 |
|---|---|---|---|
| Sep. 12, 1984 | [JP] | Japan | 59-191202 |
| Sep. 12, 1984 | [JP] | Japan | 59-191203 |
| Sep. 12, 1984 | [JP] | Japan | 59-191204 |
| Sep. 12, 1984 | [JP] | Japan | 59-191205 |
| Sep. 12, 1984 | [JP] | Japan | 59-191206 |
| Sep. 12, 1984 | [JP] | Japan | 59-191207 |
| Sep. 12, 1984 | [JP] | Japan | 59-191208 |
| Sep. 12, 1984 | [JP] | Japan | 59-191209 |
| Sep. 12, 1984 | [JP] | Japan | 59-191210 |
| Sep. 12, 1984 | [JP] | Japan | 59-191211 |
| Sep. 12, 1984 | [JP] | Japan | 59-191212 |
| Sep. 12, 1984 | [JP] | Japan | 59-191213 |
| Sep. 12, 1984 | [JP] | Japan | 59-191214 |
| Sep. 12, 1984 | [JP] | Japan | 59-191215 |
| Sep. 12, 1984 | [JP] | Japan | 59-191216 |
| Oct. 17, 1984 | [JP] | Japan | 59-217922 |
| Jan. 16, 1985 | [JP] | Japan | 60-5380 |
| Jan. 17, 1985 | [JP] | Japan | 60-6163 |

[51] Int. Cl.$^5$ ............................................. G11B 5/66
[52] U.S. Cl. ........................................ 428/694; 428/900; 369/13; 369/288; 365/122
[58] Field of Search ................. 428/694, 900; 369/13, 369/280; 365/122

[56] References Cited

U.S. PATENT DOCUMENTS

| 3,965,463 | 6/1976 | Chaudhari et al. | 340/174 TF |
|---|---|---|---|
| 4,310,899 | 1/1982 | Biesterbos et al. | 365/122 |
| 4,390,660 | 6/1983 | Ohta | 524/721 |
| 4,489,139 | 12/1984 | Ohta | 428/621 |
| 4,496,395 | 1/1985 | Croat | 75/123 E |
| 4,544,443 | 10/1985 | Ohta | 156/643 |
| 4,579,777 | 4/1986 | Honguu | 428/336 |
| 4,612,068 | 9/1986 | Tanaka | 148/301 |
| 4,695,514 | 9/1987 | Takahashi | 428/432 |
| 4,710,431 | 12/1987 | Van Engelen et al. | 428/457 |

FOREIGN PATENT DOCUMENTS

| 2069528 | 8/1981 | European Pat. Off. . |
|---|---|---|
| 0106948 | 5/1984 | European Pat. Off. . |
| 0108474 | 5/1984 | European Pat. Off. . |
| 0133758 | 3/1985 | European Pat. Off. . |
| 165306 | 9/1983 | Japan . |
| 084358 | 5/1984 | Japan . |
| 182506 | 8/1985 | Japan . |

OTHER PUBLICATIONS

"Magneto-Optic Properties of Nd-Fe-Fe-Co amorphous alloys", Gambino et al, J. Appl. Phys. 57(1), 4-85.

Shinsuke Tanaka, et al., "(Tb, Dy)-FeCo Based Magneto-Optical Disk", Digest of 11th An. Conf. of Japan Applied Magnetics Soc., pub. by R&D Labs., Nov. 1987, p. 263.

Lin, et al., "Magnetic and Magneto-Optic Properties of Nd-Tb-Fe-Co Vertically Magnetized Films", Digest of 11th An. Conf. of Japan Applied Magnetics Society, pub. by R&D Labs., Nov. 1987, p. 263.

Shimoda et al., "Properties of NdDyFeCoTi Magneto-Optical Media Made From Cast Alloy Target", J. Magn. Soc. Jpn. vol. 11, pp. 337-340 (1987).

*Primary Examiner*—Merrell C. Cashion, Jr.
*Assistant Examiner*—Robert J. Follett
*Attorney, Agent, or Firm*—Blum Kaplan

[57] ABSTRACT

A magnetic thin film recording layer comprised primarily of a light rare earth element and a transition metal element is disclosed. Other elements are optionally included in the film. The film has an easy axis of magnetization perpendicular with respect to the surface of the film. Magneto-optic recording systems using such films are also disclosed.

8 Claims, 5 Drawing Sheets

MAGNETO-OPTIC RECORDING SYSTEMS

CROSS-REFERENCE TO RELATED APPLICATIONS

This application is a continuation-in-part of copending application Ser. No. 775,069, filed on Sept. 11, 1985, now abandoned.

BACKGROUND FOR THE INVENTION

This invention relates to magneto-optic recording systems and, in particular, to magneto-optic recording systems that use thin film recording layers to record, reproduce and erase information data.

In 1957, a study showed that a thermo-pen can be used to record information data on a MnBi thin film. A magnetic domain can be written by the thermo-pen on the MnBi film as a result of the effect of heat from the thermo-pen.

Subsequently, development of lasers provided impetus for a comprehensive study of the effect of lasers on MnBi thin films. However, the research was of little practical utility because studies of laser sources and applications had not reached an advanced stage at that time.

By the 1970's, optical information processing techniques were significantly more advanced and studies of thin film recording layers resumed. The thin film recording layers studied were characterized by use of an amorphous rare earth transition metal alloy. Such films included binary alloy thin films like gadolinium-iron (GdFe), terbium-iron (TbFe), dysprosium-iron (DyFe) and gadolinium-iron (GdFe). Thin film recording layers containing amorphous rare earth transition metals are disclosed in Japanese Patent Publication No. 56-37607.

It was later found that use of ternary and quaternary alloys improved the properties of thin film recording layers. Such alloys included gadolinium-terbium-iron (GdTbFe) and gadolinium-terbium-iron-cobalt (GdTbFeCo). These alloys and their use as thin film recording layers are disclosed in Japanese Laid Open Publications Nos. 56-126907 and 57-94948.

Magnetic thin film recording layers operate to reproduce binary information bits because of a phenomenon known as the magneto-optic effect. To record information data, the temperature dependence of the magnetic coercivity ($H_c$) of the magnetic thin film recording layer is exploited. Magnetic coercivity is a measure of the force which must be applied to a magnetic field in order to reverse the magnetization of the materials.

To record an information bit on the thin film recording layer of a magneto-optic recording system, a small magnetic field bias is applied to the film and light flux from a laser is then focused on a small area (about one micrometer) of the film to heat that area to a temperature at which the magnetic coercivity of the film is less than the field bias or at which the area becomes paramagnetic.

The information bit is read by reflecting polarized light on the film surface. Rotation of the polarization of the reflected light is measured by transmission through a polarizor. This rotation is referred to as the magneto-optical Kerr effect. The rotation angle, also known as Kerr rotation angle, is measured in degrees or in minutes.

Erasure of the information bits is accomplished either by reversing the field bias and rewriting onto the film or by increasing the overall field bias until it exceeds the magnetic coercivity of the film.

Conventional magnetic thin film recording systems have several disadvantages. Specifically, the supply of heavy rare earth elements is limited. Furthermore, use of a large amount of only one specific heavy rare earth element is economically disadvantageous. For this reason, the cost of producing conventional types of magneto-optic recording systems using magnetic thin films is high.

Additionally, the magnetic thin films used in magneto-optic recording systems can be prepared by sputtering. An alloy target having a predetermined composition is primarily used as the sputtering target. However, heavy rare earth element and transition metal element alloys are very brittle. For this reason, it is difficult to produce a large alloy target.

In order to solve this problem, methods for disposing a rare earth element pellet on a transition metal sputtering target, for sputtering two separate targets of transition metal and rare earth metal simultaneously and alloying them on a substrate and for forming a composite target by pasting a transition metal and a rare earth metal together have been proposed. This last method is disclosed in Japanese Patent Laid Open Publication No. 51-63492. All of these methods are disadvantageous in that the composition of the ferromagnetic alloy thin film produced is not uniform and productivity is low.

Additionally, heavy rare earth transition metal thin films such as those used in conventional magneto-optic recording systems have poor weatherability. This means that various properties of the film deteriorate rapidly after the film is formed.

In heavy rare earth transition metal alloys, the temperature co-efficient of magnetization is large. This large temperature co-efficient causes a proportionately large change in Kerr rotation angle as a result of temperature changes. Consequently, reading properties of the thin film are unstable because of the temperature dependency of the Kerr rotation angle.

In GdFe and GdCo thin films, the Kerr rotation angle is larger and optical reproduction properties are better than for TbFe or GdTbFeCo. However, since the magnetic coercivity of GdFe and GdCo is small (several hundredths of an oersted), magnetic domains which are information bits are not stable. On the other hand, TbFe and GdTbFeCo thin films have large magnetic coercivity, and the magnetic domains of these films are stable. However, Kerr rotation angle is small and optical reproduction properties are not good.

As can be seen, in conventional methods for improving ferromagnetic thin film recording, reflectance of the thin film decreases as Kerr rotation angle increases. Since both high reflectance and large Kerr rotation angle are optimum, no fundamental improvement is achieved.

Accordingly it is desired to provide ferromagnetic thin film recording systems that overcome the disadvantages inherent in prior art systems.

SUMMARY OF THE INVENTION

Generally speaking, in accordance with the invention, magnetic thin films including principally a light rare earth element and a transition metal element are provided. A sputtering target of these elements is used to prepare the thin film. Other elements are optionally included in the film. Improved magneto-optic recording systems using these thin films as recording layers are also provided.

Accordingly, it is an object of the invention is to provide improved magnetic thin films.

Another object of the invention is to provide improved magneto-optic recording systems.

A further object of the invention is to provide magneto-optic recording systems which have improved recording reproducing and erasing characteristics.

Yet another object of the invention is to provide magneto-optic recording systems having improved stability.

Yet a further object of the invention is to provide magneto-optic recording systems that can be mass produced at low cost.

Still other objects and advantages will in part be obvious and will in part be apparent from the specification and drawings.

The invention accordingly comprises the features of construction, combinations of elements and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

$$C/N = 10 \log 10 \frac{Pc}{Pn} \text{ (db)}$$

wherein Pc is the reproducing power of information bit (carrier) frequency measured by specific frequency band width and Pn is te noise power of the same frequency measured by the same band width.

DETAILED DESCRIPTION OF THE INVENTION

The present invention is a magnetic thin film of a light rare earth element and a transition metal having the formula: $LR_xTM_{(1-x)}$. LR is at least one light rare earth element such as cerium, praseodymium, neodymium or samarium. TM is at least one transition metal such as iron, cobalt or nickel. X is the fractional amount of rare earth element expressed as a decimal and is in the range of about above 0 to 0.5. More preferably, x is between about 0.2 to 0.4. Boron can also be added to the thin film in an amount of between about 0.0001 to 0.2 atomic percent. In the preferred embodiments of the invention, the film is principally neodymium (Nd) and iron (Fe). Other elements are optionally included in the film as discussed below. Magneto-optic recording systems using these magnetic thin films as recording layers are also part of the invention.

The films provided in accordance with the present invention have an axis of magnetization perpendicular with respect to the film surface. Magnetism is achieved by the magnetic combination of a light rare earth element and a transition metal element. However, in general the magnetization is so large that it has seemed impossible to obtain a film which is perpendicularly magnetized with respect to the film surface. It has now been found that when a neodymium-iron (NdFe) alloy thin film is formed on a glass substrate by sputtering, a perpendicularly magnetized thin film is obtained.

The composition of a preferred alloy thin film is defined as $Nd_xFe_{1-x}$ where x is a number greater than 0 and less than or equal to 0.5 that represents the fractional amount of neodymium (Nd) in the alloy expressed as a decimal. In a preferred embodiment, the amount of neodymium (Nd) is in the range of from about 20 to about 40 atomic percent, i.e., x is between about 0.20 and 0.40, at a substrate temperature of between about 80° and about 250° C.

It has been found that the magneto-optic properties of a neodymium-iron (NdFe) thin film are superior to the properties of conventional amorphous alloy thin films which use gadolinium (Gd), terbium (Tb) and dysprosium (Dy). Furthermore, as can be seen in the following table, neodymium (Nd) is more abundant than heavy rare earth elements like gadolinium (Gd), terbium (Tb) and dysprosium (Dy). Table 1 shows the percentage of each of the elements neodymium (Nd), gadolinium (Gd), terbium (Tb) and dysprosium (Dy) based on the total amount of all rare earth elements.

TABLE 1

| Name of Element | Percentage of all Rare Earth Elements (monazite) |
|---|---|
| Nd | 19% |
| Gd | 1.7 |
| Tb | 0.16 |
| Dy | 0.5 |

As can be seen from Table 1, neodymium (Nd) is significantly more abundant than gadolinium (Gd), terbium (Tb) or dysprosium (Dy). This is particularly significant from an industrial point of view. Furthermore, it has been found that a neodymium-iron (NdFe) alloy sputtering target can be formed by ordinary casting and abrasion.

Cobalt (Co) and nickel (Ni) can be added to the neodymium iron alloy (NdFe) thin film of the present invention by decreasing the amount of iron (Fe) in the film. In a preferred embodiment, more than one kind of cobalt (Co) and nickel (Ni) are used. If the cobalt (Co) and/or nickel (Ni) is added in an amount of less than about 50 atomic percent of the transition metal in the film, the perpendicular magnetization of the film is maintained. The values of coercive force, Curie temperature and Kerr rotation effect can be varied as necessary.

These same effects are observed when light rare earth elements are used. Suitable light rare earth elements include, but are not limited to, cerium (Ce), praseodymium (Pr) and samarium (Sm). As in the case of cobalt (Co) and nickel (Ni), the amount added is less than about 50 atomic percent of the transition metal in the film. When adding these light rare earth elements, the percentage of neodymium (Nd) is decreased.

The temperature dependence of the Kerr rotation angle and the coercive force of the neodymium-iron (NdFe) thin film of the present invention are smaller than that of magnetic thin films made of heavy rare earth elements and transition metal elements. It is desirable for ferromagnetic thin films to have stable properties with temperature.

It is also possible to add nickel (Ni) or cobalt (Co) the neodymium-iron (NdFe) thin film by decreasing the amount of iron (Fe). The addition of the nickel (Ni) or cobalt (Co) weatherability of the film. However, because the magnetic properties of the film are deteriorated by the addition of nickel (Ni), it is desirable to compensate for this deterioration by the addition of boron (B).

Furthermore, neodymium (Nd) can be decreased by the addition of light rare earth elements, such as lanthanum (La), cerium (Ce), praseodymium (Pr) and samarium (Sm).

The characteristics of the present invention will be explained in more detail in connection with the Examples.

EXAMPLE 1

NdFe alloy targets having a diameter of 150 mm were produced by melting and casting in a low frequency induction furnace. The alloy targets were used to prepare magnetic NdFe thin films on glass substrates by radio frequency sputtering.

Magnetic NdFe alloy thin films were prepared by changing the composition of the alloy targets and the temperature of the glass substrates. Perpendicularly magnetized alloy thin films were obtained when the alloy targets contained between about 20% and about 40% Nd by weight and the temperature of the glass substrates was between about 80° and about 250° C.

The temperature of the glass substrates was most preferably in the range of from about 160° to about 180°. It was found that when the temperature of the glass substrate was less than about 80° C. or greater than 250° C. perpendicularly magnetized alloy thin films were not obtained.

The alloy thin films obtained had the composition $Nd_xFe_{(1-x)}$ where x was the fractional amount of Nd in the composition expressed as a decimal.

Figure 1:
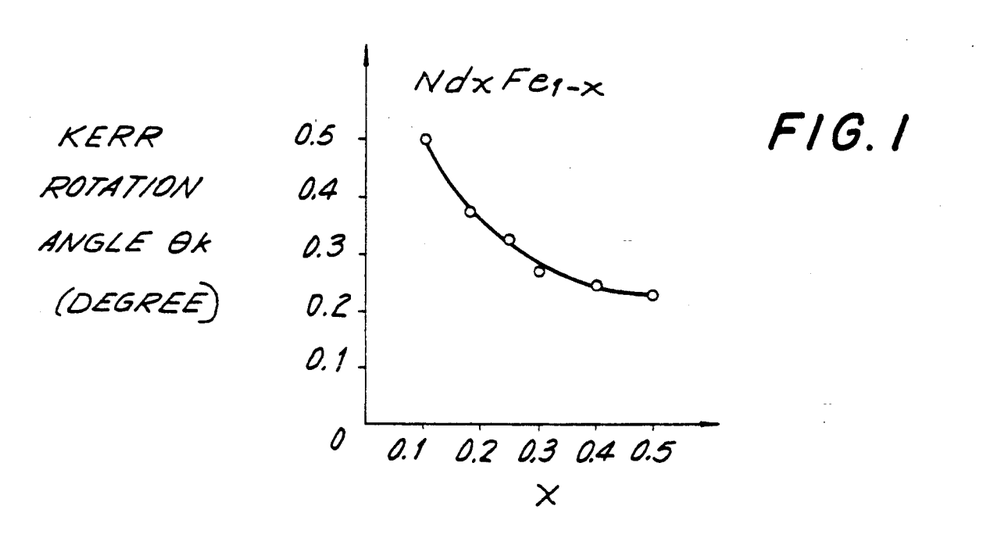
FIG. 1 is a graph showing the relationship between Kerr rotation angle $(\theta_K)$(degrees) as a function of x where x defines the thin film composition $Nd_xFe_{(1-x)}$.

FIG. 1 shows Kerr rotation angle ($\theta_K$)(degrees) as a function of x for these compositions with x varying between 0.1 and 0.5.

Figure 2:
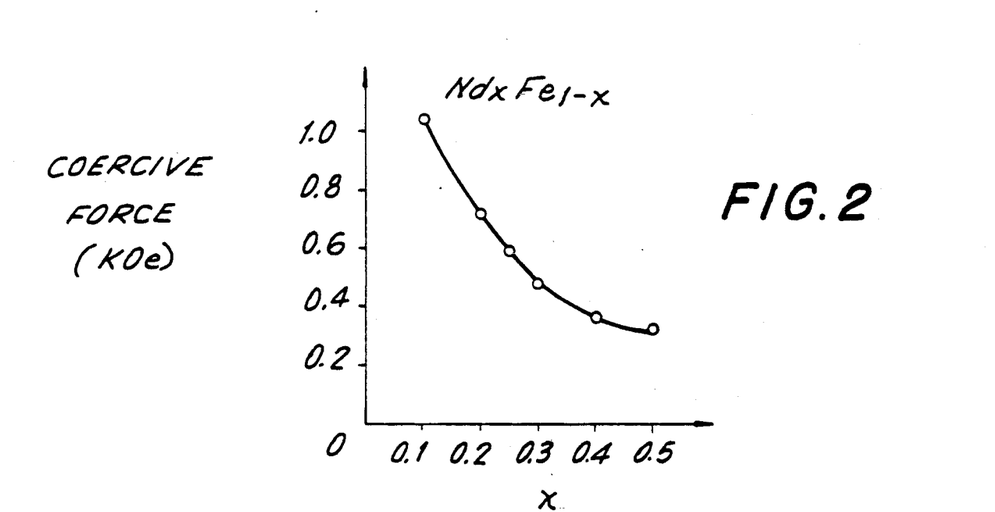
FIG. 2 is a graph showing the relationship between coercive force $(KO_e)$ as a function of x where x defines the thin film composition of FIG. 1.

FIG. 2 shows coercive force ($KO_e$) as a function of x for these compositions with x varying between 0.1 and 0.5.

These perpendicularly magnetized thin films had sufficiently large Kerr rotation angles and coercivity to be used as recording layers in magneto-optic recording systems.

EXAMPLE 2

NdFeM alloy targets for sputtering were prepared. The targets had the composition $Nd_{0.3}(Fe_{(1-\beta)}M_\beta)_{0.7}$ wherein M was Co or Ni and $\beta$ was 0.2, 0.3, 0.4, 0.5 or 0.6 and represented the fractional amount of M in the composition equal to 14, 21, 28, 35 and 42%, respectively. The alloy targets were used to produce magnetic NdFeM thin films on glass substrates by radio frequency sputtering. Except in the case where the NdFeM thin film was $Nd_{0.3}(Fe_{0.4}Co_{0.6})_{0.7}$, perpendicularly magnetized thin films were obtained.

Figure 3:
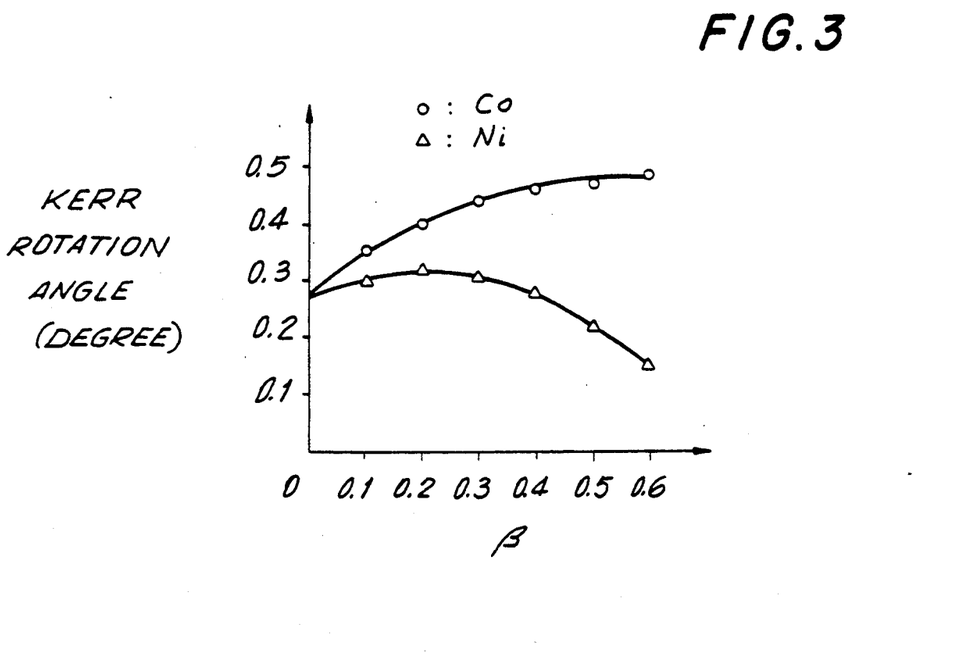
FIG. 3 is a graph showing the relationship between Kerr rotation angle $(\theta_K)$(degrees) as a function of $\beta$ where $\beta$ defines the thin film composition $Nd_{0.3}(Fe_{(1-\beta)}M_\beta)_{0.7}$ wherein M is Co or Ni.

FIG. 3 shows Kerr rotation angle ($\theta_K$)(degrees) as a function of $\beta$ for these compositions with $\beta$ varying between 0.1 and 0.6.

Figure 4:
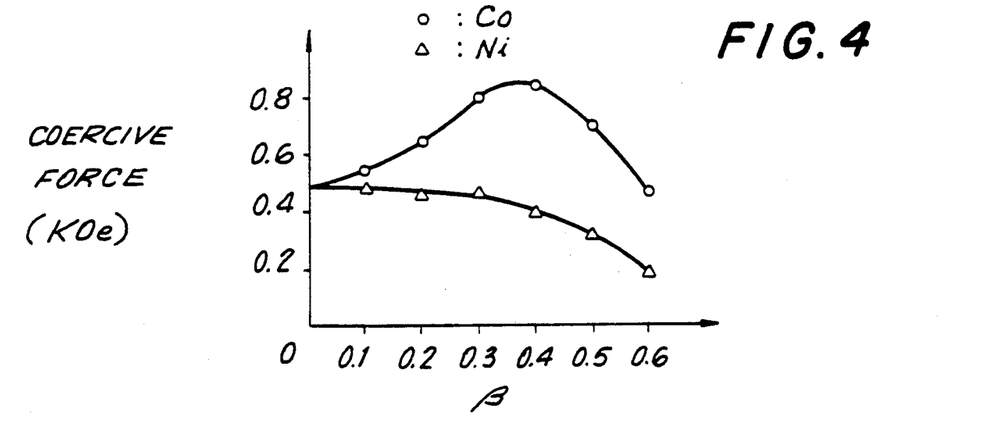
FIG. 4 is a graph showing the relationship between coercive force $(KO_e)$ as a function of $\beta$ where $\beta$ defines the thin film composition of FIG. 3.

FIG. 4 shows coercive force ($KO_e$) as a function of $\beta$ for these compositions with $\beta$ varying between 0.1 and 0.6.

Figure 5:
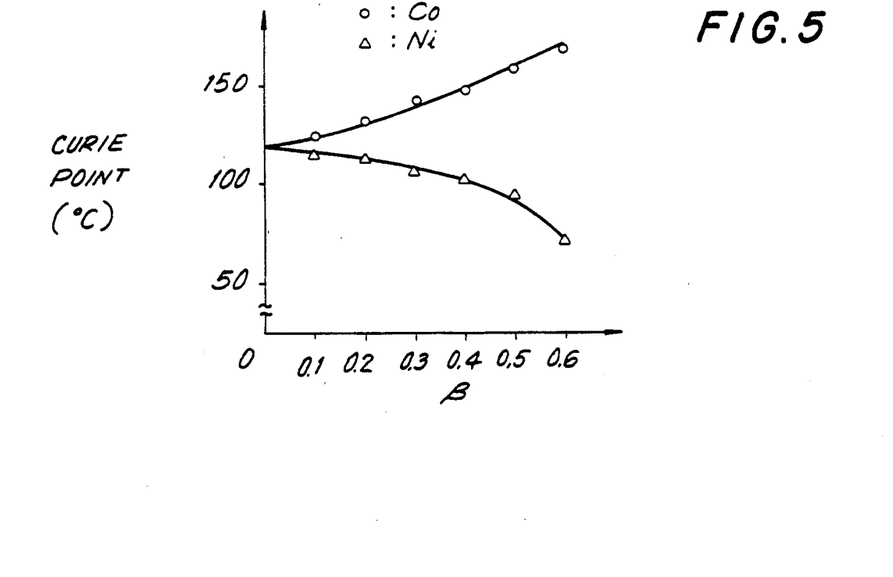
FIG. 5 is a graph showing the relationship between Curie point temperature (°C.) as a function of $\beta$ where $\beta$ defines the thin film composition of FIG. 3.

FIG. 5 shows Curie point (°C.) as a function of $\beta$ for these compositions and $\beta$ varying between 0.1 and 0.6.

As can be seen in FIGS. 3 and 4, Kerr rotation angle and coercivity are improved when Co is used in the composition, especially when compared to the compositions of Example 1. Kerr rotation angle is somewhat improved when Ni is used in this composition as compared to the composition of Example 1. However, when Ni is used and $\beta$ is greater than 0.5, the Curie point is outside of the range which is practical for use in magneto-optic recording systems.

EXAMPLE 3

Alloy thin films were prepared from alloy targets having the formula $(Nd_{1-\alpha}R_\alpha)_{0.70}Fe_{0.30}$ wherein R was selected from the group consisting of Ce, Pr and Sm and $\alpha$ ranged between 0 and 0.6.

Figure 6:
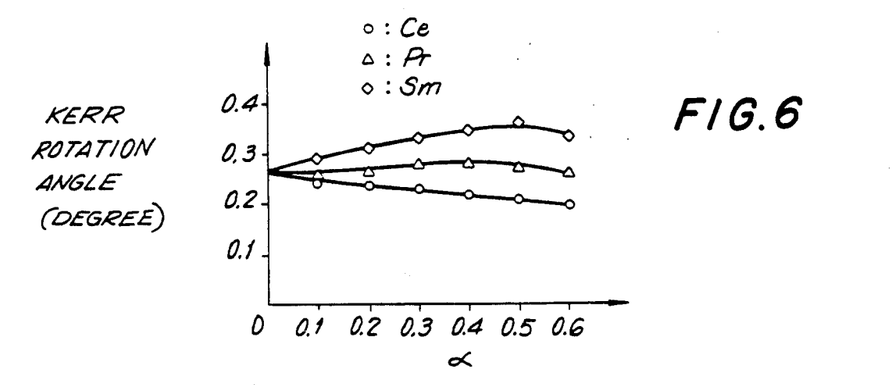
FIG. 6 is a graph showing Kerr rotation angle $(\theta_K)$(degrees) as a function of $\beta$ where $\beta$ defines the thin film composition $(Nd_{(1-\beta)}R_\beta)_{0.3}Fe_{0.7}$ wherein R is Ce, Pr or Sm.

FIG. 6 shows Kerr rotation angle ($\theta_K$)(degrees) as a function of $\alpha$ for these compositions with $\alpha$ varying between 0.1 and 0.6. When $\alpha$ is greater than 0.5, perpendicularly magnetized films were not obtained. Except in the case where Ce was used, the Kerr rotation angle remained constant or increased.

Figure 7:
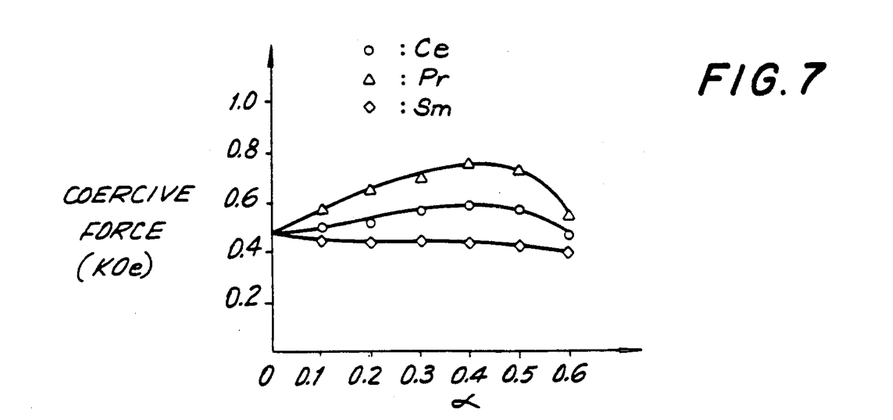
FIG. 7 is a graph showing the relationship between coercive force $(KO_e)$ as a function of $\alpha$ where $\alpha$ defines the thin film composition of FIG. 6.

FIG. 7 shows coercive force ($KO_e$) as a function of $\alpha$ for these compositions with $\alpha$ varying between 0.1 and 0.6. Except where Sm was used, the coercive force increased until the composition reached the point where the film was no longer perpendicularly magnetized, i.e., at $\alpha$ greater than 0.5.

EXAMPLE 4

Thin films having the composition shown in Table 2 were prepared using alloy targets having the same compositions.

TABLE 2

| | |
|---|---|
| Example 1 | $(Nd_{0.7}Pr_{0.3})_{0.25}(Fe_{0.7}Co_{0.3})_{0.75}$ |

TABLE 2-continued

| | |
|---|---|
| Example 2 | $(Nd_{0.6}Sm_{0.4})_{0.3}(Fe_{0.7}Co_{0.3})_{0.7}$ |
| Example 3 | $(Nd_{0.7}Pr_{0.2}Sm_{0.1})_{0.25}(Fe_{0.6}Co_{0.4})_{0.75}$ |
| Example 4 Comparison | $(Nd_{0.8}Ce_{0.2})_{0.3}(Fe_{0.6}Co_{0.3}Ni_{0.1})_{0.7}$ |
| Example 1 | $Nd_{0.25}Fe_{0.75}$ |
| Example 2 | TbFe |
| Example 3 | GdFe |

The Kerr rotation angle ($\theta_K$)(degrees) and coercive force ($KO_e$) of each film are shown in Table 3.

TABLE 3

| | Kerr Rotation Angle (Degree) | Coercive Force ($KO_e$) |
|---|---|---|
| Example 1 | 0.42 | 1.3 |
| Example 2 | 0.46 | 0.9 |
| Example 3 | 0.48 | 1.2 |
| Example 4 Comparison | 0.35 | 1.5 |
| Example 1 | 0.33 | 0.6 |
| Example 2 | 0.30 | 0.2 |
| Example 3 | 0.35 | 4 |

As can be seen in Table 3, compositions prepared using light rare earth elements and transition metal elements in combination with Nd and Fe have improved Kerr rotation angles and coercivity as compared to thin film compositions containing only Nd and Fe. Furthermore, these compositions have excellent properties as compared to TbFe and GdFe, well known compositions for use in magnetic thin film.

EXAMPLE 5

Using an alloy target having a diameter of 150 mm, a magnetic thin film was prepared on a water cooled glass substrate using radio frequency sputtering. The alloy target and, consequently, the magnetic thin film had the composition $Nd_{0.15}(Fe_{0.8}Ni_{0.2})_{0.83}B_{0.02}$. Then, without breaking the vacuum, a silicon dioxide protective film and a copper reflective film were formed on the magnetic thin film.

The magnetic and optic properties of the magnetic thin film at room temperature are shown in Table 4.

TABLE 4

| Properties | Value |
|---|---|
| Saturation Magnetization (Is) | 630 G |
| Coercive Force (Hc) | 1,500 $O_e$ |
| Constant of Magnetic Anistropy ($K_1$) | $6.2 \times 10^6$ erg/cm$^3$ |
| Kerr Rotation Angle ($\theta_K$) | 26 min |
| Curie Point (Tc) | 142° C. |

As can be seen, the magnetic and optic properties of the thin film were good. The film structure is amorphous as shown by X-ray diffractometry. The film has an easy axis of magnetization perpendicular with respect to the film surface, i.e., the film is perpendicularly magnetized. Prior to measurement of the magneto-optic properties of the film at room temperature, the film was allowed to stand at high temperature and high humidity for a predetermined period of time. Then the reliability of the film was evaluated by measurement of the magneto-optic properties at room temperature.

Figure 8:
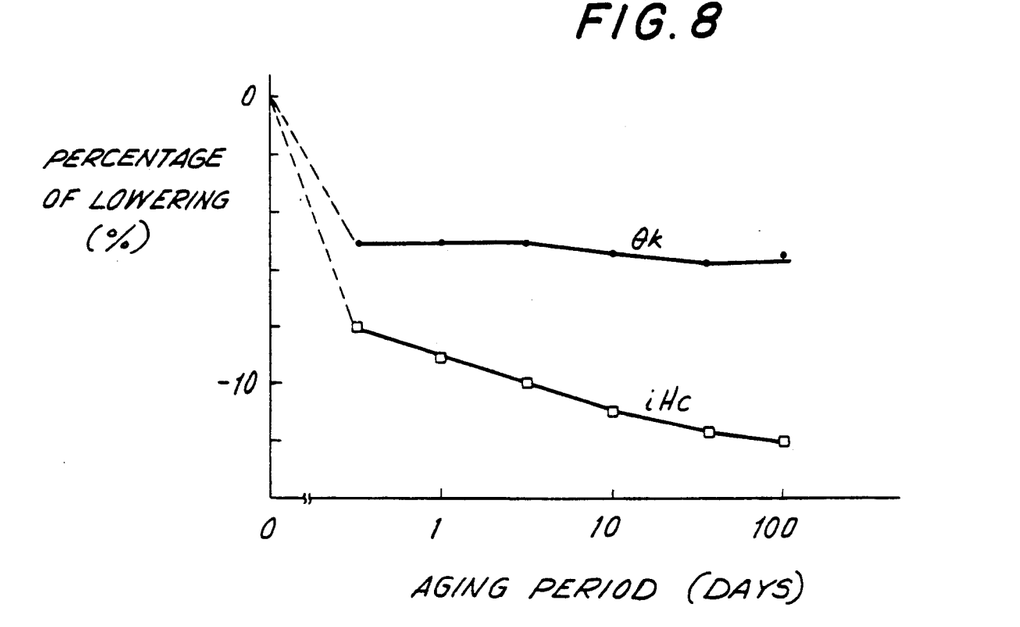
FIG. 8 is a graph showing percent lowering of coercive force (Hc) and Kerr rotation angle $(\theta_K)$(degrees) of Nd-Fe-Ni-B film as a function of aging period (days) at 60° and 90% humidity.

FIG. 8 shows the percent lowering of Kerr rotation angle ($\theta_K$)(degrees) and coercive force at 60° C. and 95% humidity over a period ranging from ½ day to 100 days.

Figure 9:
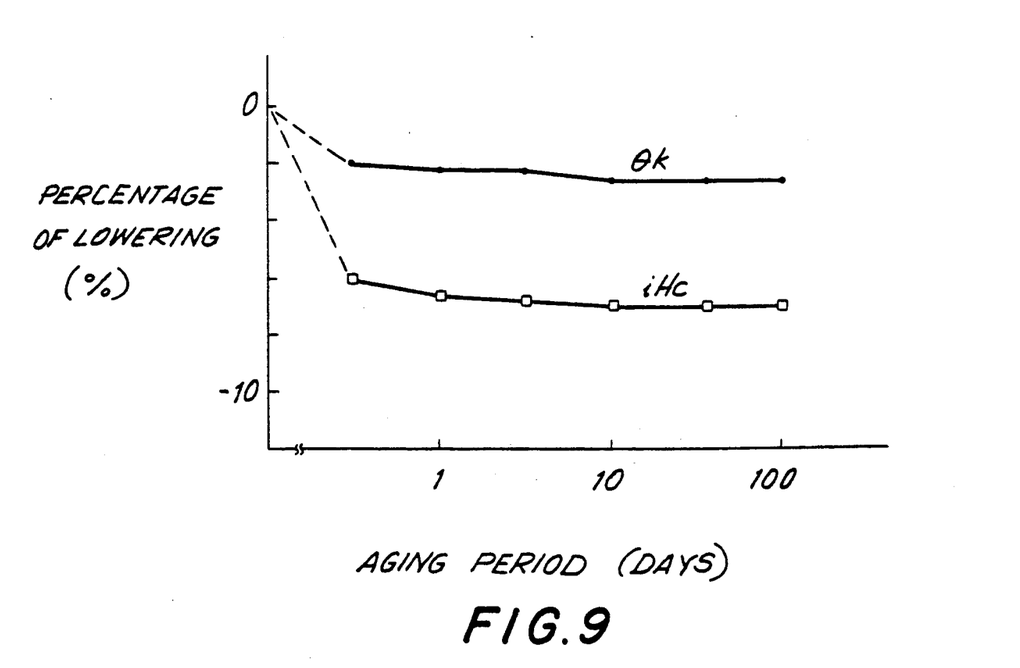
FIG. 9 is a graph showing percent lowering of coercive force (Hc) and Kerr rotation angle $(\theta_K)$(degrees) of Nd-Fe-Ni-B film as a function of aging period (days) at 90° C.

FIG. 9 shows the percent lowering of Kerr rotation angle and coercive force at 80° C. for a period ranging between about ½ day and 100 days.

The decrease in both Kerr rotation angle and coercive force is not a serious problem. In fact, the data shown in FIGS. 8 and 9 is much improved as compared with conventional data.

EXAMPLE 6

Alloy targets having the composition:

$$Nd_{0.98-x}(Fe_{0.6}Ni_{0.4})_xB_{0.02}$$

wherein x had the values 0.48, 0.58, 0.68, 0.78 and 0.88 were prepared. These targets were used to form magnetic thin films on glass substrates using radio frequency sputtering. Without breaking the vacuum, aluminum layers were deposited on the films by sputtering. The aluminum layer served as both a protective layer and a reflective layer.

All of the compositions were in an amorphous state, as confirmed by X-ray diffractometry, except the composition wherein x was equal to 0.48. When x was equal to 0.58, 0.68 and 0.78, magnetic thin films having an easy axis of magnetization perpendicular with respect to the film surfaces were obtained. Table 5 shows the film characteristics of these compositions.

TABLE 5

| Properties | X = 78 | X = 68 | X = 58 |
|---|---|---|---|
| Is (G) | 600 | 540 | 480 |
| Hc ($O_e$) | 1,800 | 1,400 | 1,200 |
| $K_1$ (erg/cm$^3$) | $5.8 \times 10^6$ | $5.0 \times 10^6$ | $4.8 \times 10^6$ |
| $\theta_K$ (min) | 30 | 26 | 24 |
| Tc (°C.) | 140 | 130 | 125 |
| Reflectance R (%) | 52 | 62 | 48 |

Table 6 shows the percent lowering of Kerr rotation angle and coercive force after the magnetic thin film were held at 80° C. for 100 days.

TABLE 6

| Properties | X = 78 | X = 68 | X = 58 |
|---|---|---|---|
| Percentage of (%) lowering of Hc | −2.5 | −2.2 | −2.1 |
| Percentage of (%) lowering of $\theta_K$ | −1.2 | −2.0 | −1.1 |

Due to the relatively large amount of nickel in the ferromagnetic thin films of this Example, more stable films were obtained than those of Example 5.

EXAMPLE 7

Figure 10A:
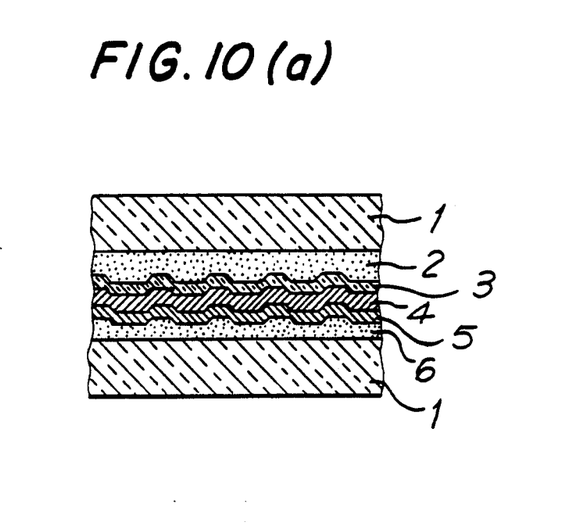
FIG. 10(a) is a cross-sectional view showing the structure of a particular magneto-optic recording system of the present invention.

A 50 nanometer (nm) amorphous thin film having the composition $Nd_{0.20}(Fe_{0.7}Ni_{0.3})_{0.77}B_{0.03}$ and an easy axis of magnetization perpendicular with respect to the film surface and a 30 nm aluminum reflective layer were formed on a grooved substrate. The grooved substrate was formed by a photo polymerization method and had a groove pitch of 2.5 micrometers (μm), a groove width a 0.8 μm, and a groove depth of 70 nm. Then a magneto-optic disk (FIG. 10(a)) having a substrate 1, a 2-P layer 2 formed on the substrate, a dielectric layer 3 formed on the 2-P layer, an Nd—Fe—Ni—B thin film layer 4 formed on the dielectric layer, an aluminum layer 5 formed on the thin film layer, a bonding layer 6 formed on the aluminum layer, and a second substrate layer 1 formed on the bonding layer was prepared. The structure of this film is shown in FIG. 10(a). The coercivity, Hc, of the disk was found to be 1.5 KO$_e$, the Kerr rotation angle, $\theta_K$, was 38 minutes and the Curie temperature was 140° C.

Data were recorded and reproduced on this magneto-optical disk by rotating the disk at 1800 rpm and using a semi-conductor laser. The recording power was 10 mW the recording magnetic field was 80 O$_e$, reproduction power was 1.2 mW and the band width was 30 KHz.

Figure 10B:
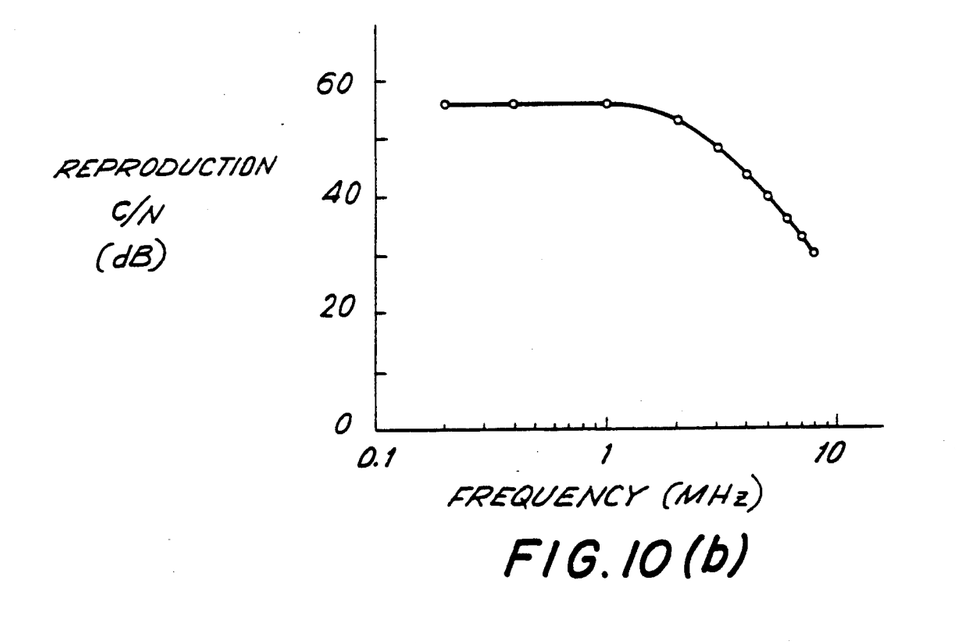
FIG. 10(b) is a graph showing reproduction C/N (dB) as a function of frequency (MHz) for the magneto-optic recording system shown in FIG. 10(a). The C/N (carrier to noise ratio) is represented by the following formula.

FIG. 10(b) shows reproduction C/N (dB) as a function of frequency (MHz). In the range where the frequency is less than 1 MH$_z$, C/N is a constant value of 56 dB.

It will thus be seen that the objects set forth above, among those made apparent from the preceding description, are efficiently attained and, since certain changes may be made in the above constructions without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A magneto-optic recording system comprising a thin film having magneto-optic recording properties having the composition consisting essentially of $$LR_{(1-x-y)}TM_xB_y$$

wherein:

LR is a light rare earth element component and consists essentially of neodymium and praseodymium;

TM is a transition metal component including iron and optionally at least one additional transition metal element selected from the group consisting of cobalt and nickel;

B is Boron;

x is the fractional amount of transition metal element component expressed as a decimal and is between about 0.6 and 0.95; and y is the fractional amount of Boron expressed as a decimal and is between about 0.0001 and 0.2.

2. The magneto-optic recording system of claim 1, wherein the transition metal component consists essentially of iron.

3. The magneto-optic recording system of claim 1, wherein iron is present in an amount of at least about 50 atomic percent of the transition metal component.

4. The magneto-optic recording system of claim 1, wherein the thin film having-magneto optic recording properties is prepared by sputtering.

5. The magneto-optic recording system of claim 1, wherein y=0.02 to 0.03.

6. A magneto-optic recording system comprising a thin film having magneto-optic recording properties, the thin film having a composition consisting essentially of about 20–40% Nd and Pr and the remainder a transition metal component including iron and optionally the addition of at least one of cobalt and nickel.

7. The magneto-optic recording system of claim 6, wherein the transition metal component includes more than about 50% iron.

8. The magneto-optic recording system of claim 6, wherein the thin film having magneto-optic recording properties is prepared by sputtering.

* * * * *